(12) United States Patent
Inman et al.

(10) Patent No.: US 6,240,980 B1
(45) Date of Patent: Jun. 5, 2001

(54) MATERIALS BAGGING MACHINE

(75) Inventors: Larry R. Inman, Warrenton, OR (US); Walter Jay, Tekamah, NE (US); Ken Sevy, Melba, ID (US)

(73) Assignee: Ag-Bag International Limited, Warrenton, OR (US)

( * ) Notice: Subject to any disclaimer, the term of this patent is extended or adjusted under 35 U.S.C. 154(b) by 0 days.

(21) Appl. No.: 09/677,069

(22) Filed: Sep. 29, 2000

(51) Int. Cl.⁷ ................................. B65B 1/04; B65B 3/04
(52) U.S. Cl. ................. 141/10; 141/73; 141/114; 141/313; 53/527; 100/100
(58) Field of Search ..................... 141/114, 313, 141/317, 73, 74, 80, 10; 53/527, 567, 570, 576; 100/65–67, 100

(56) References Cited

U.S. PATENT DOCUMENTS 4,310,036 * 1/1982 Rasmussen et al. ............. 141/114
5,671,594   9/1997 Cullen .
5,857,313   1/1999 Cullen .

FOREIGN PATENT DOCUMENTS

0123456 - A2 * 1/2000 (EP) ................................. 100/100

* cited by examiner

Primary Examiner—Timothy L. Maust
(74) Attorney, Agent, or Firm—Robert L. Harrington

(57) ABSTRACT

A bag filling process and machine wherein material to be bagged is force fed into a tunnel from an end and wherein the material is compacted and fed through the tunnel and out the opposite end which opens into a bag surrounding the tunnel. To avoid compacting and filling of the bag from the bottom up, a ramp in the bottom of the tunnel directs the flow of material to a mid-height position to promote compacting and filling of the bag from the mid-point position both downwardly and upwardly from the ramp end.

7 Claims, 3 Drawing Sheets

MATERIALS BAGGING MACHINE

FIELD OF THE INVENTION

This invention relates to bagging of materials, e.g., such as agricultural material, using a bagging machine that collects, compacts and loads the material into a large bag deployed from the machine and more particularly it relates to the manner of compacting and filling the bag.

BACKGROUND OF THE INVENTION

Bagging of agricultural materials such as silage is accomplished by large mobile machines having a wheeled chassis supporting a tunnel. The tunnel is irregularly shaped but roughly resembles a short cylinder about 4 ft. in length and 6 ft.–12 ft. in diameter. Material is forced into the tunnel through an inlet end at the forward end of the tunnel, the material is compacted in the tunnel and then fed through the open end at the rear of the tunnel and into a bag that encloses and surrounds the open rear end of the tunnel. The feeding process is continuous and the bag is deployed off the tunnel as the machine moves away from the bag. When filled, the bag may be 8 ft.–12 ft. in diameter and up to 500 ft. in length.

A concern in the bagging of such materials is compaction and total filling of the bag (sometimes referred to simply as compaction). If the material does not fill the bag, i.e., it is not tightly compacted into the bag, there is the obvious loss of efficiency (more bags are required for storing a given quantity of material, the bags take up more space, filling bags too loosely takes more time than filling one bag tightly) and the not so obvious concern for bag tearing (loose folds in the bag are more likely to be snagged and wind damaged) and material preservation (the compacted material inhibits circulation of air which induces spoiling of the material).

The early versions of these bagging machines attained the desired fill and compaction by placing a backstop at the end of the bag with cables extended from the backstop along the sides of the bag and to a reel at each side of the bagging machine. The reels deployed cable only when a desired back pressure was achieved and thus as the bag was filled, additional bag length was deployed only when the existing bag length was desirably compacted.

The backstop and cable (each cable being, e.g., 300 ft. in length) were initially considered an undesirable necessity. Once the bag was filled, the long cables had to be rewound back onto the reels, the backstop loaded onto the machine and hauled to a new site where start up required remounting the backstop and cable connections.

Compaction can be enhanced by providing the bagging machine with brakes. However, the pressures needed to achieve sufficient compaction and filling of the bag will typically produce skidding of the machine's wheels and particularly in conditions where the ground surface is slippery as when wet. Other systems intended to replace the backstop and cable connection include devices in the tunnel, e.g., internal cables and gate-like members that impede the flow through the tunnel (see U.S. Pat. Nos. 5,676,594, 5,857,313 and 5,860,271). Still others provide for an anchor device to be embedded in the bag material (see U.S. Pat. No. 5,899,247 and application for U.S. patent Ser. No. 09/335, 240). However, none of these replacement systems achieve the desired compaction as previously achieved using the backstop and cable system. The present invention is believed to be a step closer to achieving the desired compaction and filling of the bag.

BRIEF DESCRIPTION OF THE INVENTION

To appreciate the invention, one must first appreciate what is taking place as the material is being bagged. The following explanations are based at least in part on theory but are believed to accurately explain how and why the invention works as it does.

The inlet to the tunnel is an opening that is narrow in height and substantially the width of the tunnel and located near the tunnel floor. A rotor occupies this opening and as it rotates, tines carried by the rotor force, e.g., silage material, through the inlet. Consider the situation wherein the bag deployment is inhibited by the backstop. The material is first piled up against the backstop and then the space forward of the backstop is filled in. All during this process, the material is also being compacted. As the resistance to compaction and bag filling increases, the resistance to material flow into the tunnel and bag increases. The rotor is equal to this task and continues to force material into the tunnel.

The flow of material seeks the path of least resistance and builds upwardly. As the material height increases, the weight of the material further increases the resistance and much of the pressure is now directed forwardly against the front tunnel wall, i.e., above the inlet, as well as upwardly and rearwardly. As long as the backstop is prevented from moving relative to the tunnel (or vice versa), the material movement continues to fill the tunnel upwardly. The operator need only appreciate at what point in the pressure build up that the entire tunnel is filled and desirably compacted. The brakes on the cable reel drums are set to release at that pressure and the machine moves forward to deploy additional bag length. The bag and the material in the bag remain stationary and the movement of the machine away from the bag produces additional space behind the machine for receiving additional material. This process is repeated until the bag is filled.

The process as described requires a pressure build up far in excess of what is needed to compact the silage. However, the excessive pressure is required in order to fill the bag to the top. That is, the movement of the incoming silage to the unfilled space at the top of the bag requires forcing the material upwardly through a 3 ft.–5 ft. thickness or more of the material that has already been compacted.

The alternate processes using gates in the tunnel are designed to pre-compact the material but they do not successfully force the material to the upper reaches of the bag. The alternate anchor device inhibits movement of the machine but there is again difficulty in achieving the holding power necessary to force the material to the upper reaches of the bag.

THE INVENTION

The present invention is largely a recognition that achieving the desired density of the material is not the problem but instead it is the need to achieve the force necessary to cause material flow upwardly through the compacted material depth so as to fill the bag to the upper reaches of the bag height. The invention provides a solution to the problem in the form of an upwardly and rearwardly directed ramp. The ramp begins near the rotor at the front of the tunnel and extends upwardly and rearwardly to the rear end of the tunnel where it reaches a height of 2 ft.–3 ft. (this height may vary). Material flow is directed up the ramp and off the ramp end and directly into the bag. The material in the bottom 2 ft. or 3 ft. of the bag is compacted from the top down as material is forced over the ramp. Thus, as back pressure builds to the point where the machine is forced forward (opposed by the brakes of the machine), the forward movement opens a gap behind the ramp which as explained is filled from the top down. The pressure required to direct material to the top of the bag is significantly reduced (the material height or depth that has to be penetrated by material flow is reduced) and is within the capability of the machine brakes which is also sufficient to produce the desired compaction.

Whereas U.S. Pat. Nos. 5,671,594 and 5,857,313 provide a press plate that purports to direct the material outwardly and upwardly, it extends only a short distance in the tunnel. As material builds in the tunnel, the material will simply flow up and over the plate and follow a path of least resistance along the bottom of the tunnel and in the manner as discussed above. Such does not provide the desired filling of the bag and in both patents, cable loop compression is provided to enhance compaction of the material inside the tunnel.

The advantages of the invention will be better understood and appreciated upon reference to the following detailed description and drawings referred to therein.

DESCRIPTION OF THE PREFERRED EMBODIMENT

Figure 1:
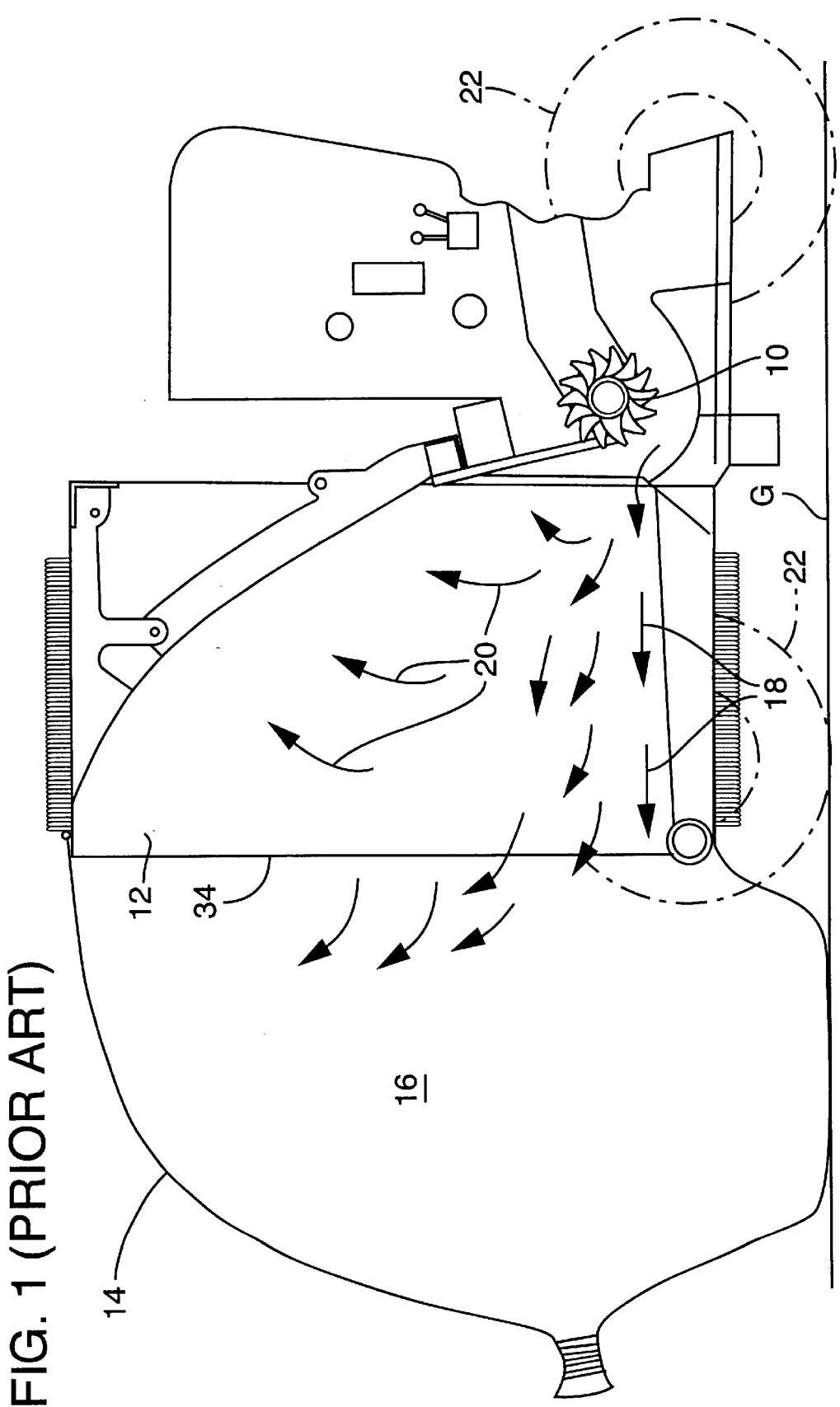
FIG. 1 illustrates schematically a prior art bagging machine and the flow of materials from the machine into the bag.

FIG. 1 illustrates a prior art machine. A rotor 10 forces the material into the tunnel 12 of the machine until the tunnel and deployed portion of the bag 14 are substantially filled with material 16. When reaching this state, the material 16 at the bottom of the tunnel and bag is more compacted than that closer to the top as dictated by the direction of material flow, gravity and material weight.

At this point of being mostly but not completely filled, the flow of the material into the tunnel and bag represented by arrows 18 becomes increasingly resisted and a back pressure builds as indicated by arrows 20. This back pressure urges forward movement of the machine 12 which has to be resisted, e.g., by the brakes of the machine incorporated into the machine wheels 22.

To achieve complete filling of the bag, the flow of material has to continue upwardly which requires that the overlying mass of material be lifted. Wheel braking is not sufficient to produce this required resistance and the result is a space in the top of the bag that is loosely packed and likely devoid in part of any material. As explained, this results in bag damage and spoilage of the material.

Figure 2:
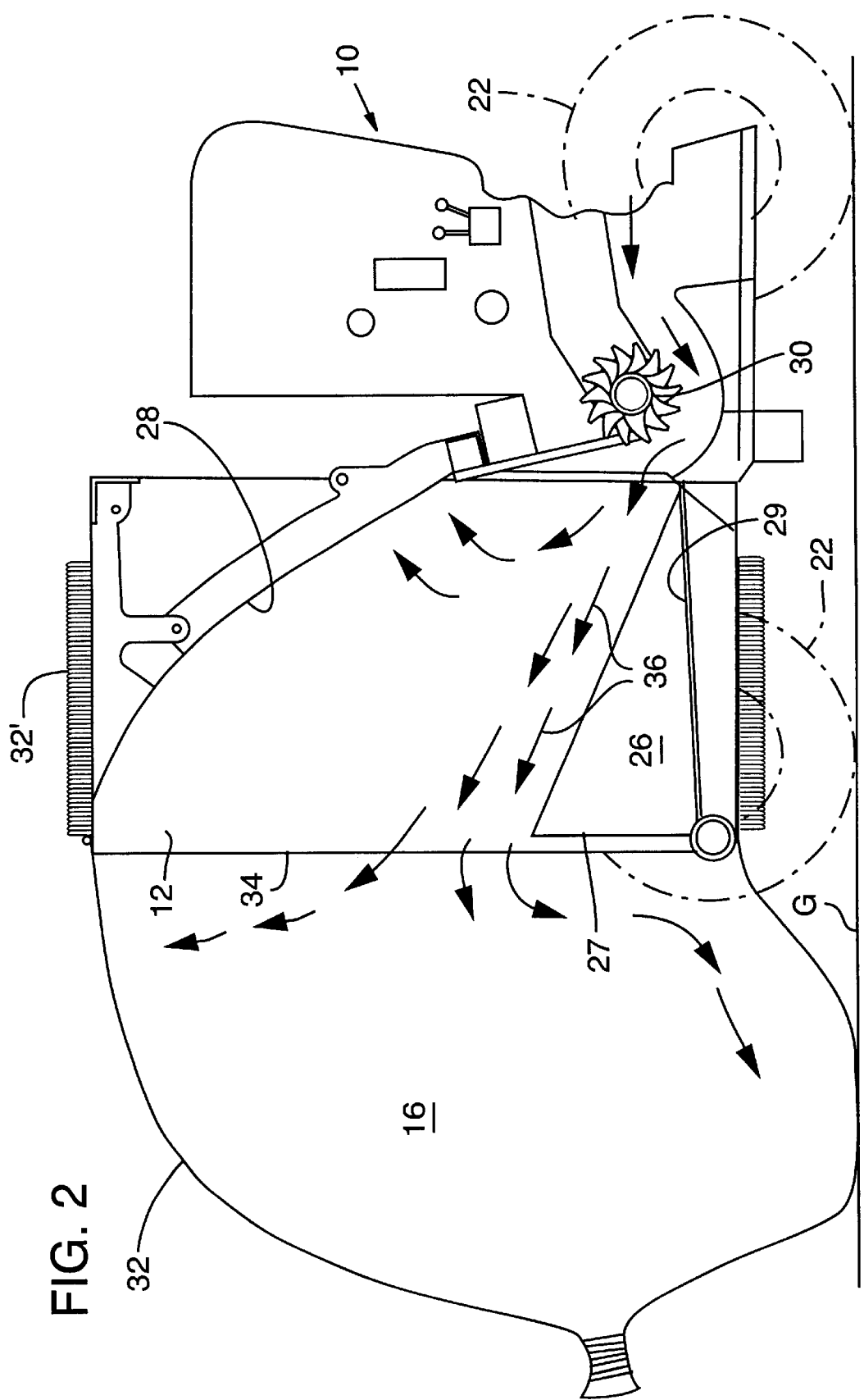
FIG. 2 illustrates an improved machine of the present invention and the flow of materials from the machine into a bag being filled.
Figure 3:
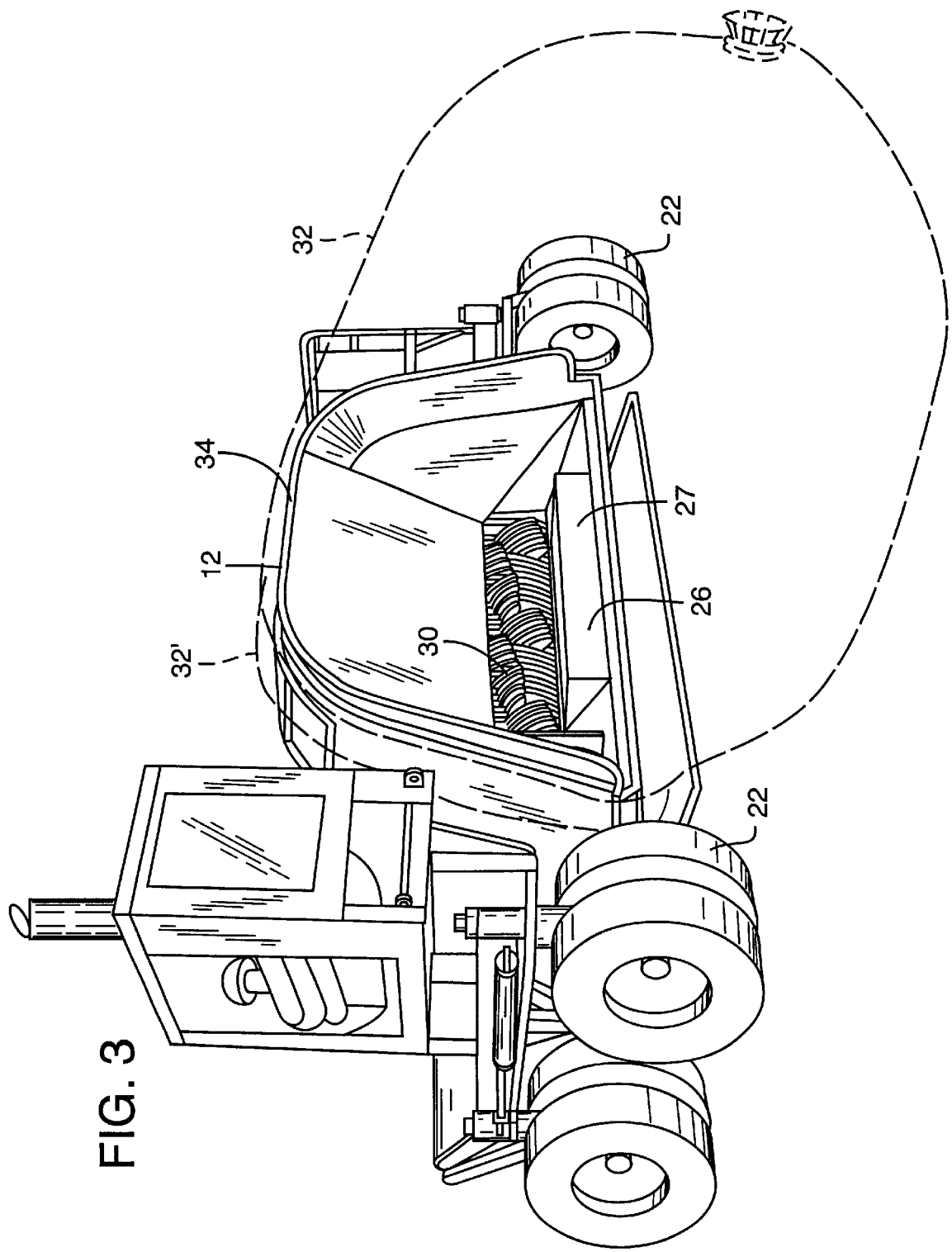
FIG. 3 is a perspective view showing the ramp member mounted in the open rear end of the machine.

FIGS. 2 and 3 represent a bagging machine of the present invention. A ramp 26 is mounted to the floor 29 of the tunnel 28 which has its front lower end positioned close behind the rotor 30 and ramps upwardly to the rear end of the tunnel, e.g., to a height of about 20%–30% of the height of the tunnel which is in the order of the 2'–3' above the floor level. The angle of the ramp relative to the tunnel floor is in the order of 30 degrees.

As will be noted, at the end of the tunnel (and ramp), the bag 32 is deployed onto the ground G and becomes stationary whereas the tunnel 28 moves forward. With forward movement, the machine rear edge 34 moves forward relative to the previously deployed bag portion and the material deposited therein. Incremental portions of the bag 32' gathered on the tunnel exterior are deployed off the tunnel.

The movement of the material is illustrated again by arrows. As noted, the primary movement is up the ramp represented by arrows 36. As the tunnel moves forward, the material flow is directed downwardly behind ramp wall 27 and upwardly toward the top of the bag. The weight of the material resisting the flow at the point where the material is forced into the bag, i.e., at the top of the ramp, is substantially reduced. By maintaining the wheel brakes in a braking mode, the bag can be filled to the top reaches of the bag with substantially less rotor feed pressure and brake resistance than previously required. The brakes are accordingly set to release at that back pressure where filling is completed.

Numerous variations will become apparent to those skilled in the art and the scope of the invention is accordingly determined by the claims appended hereto.

What is claimed is:

1. A process for filling large plastic bags with material comprising:
   providing a tunnel mounted on a mobile chassis having releasable braking action, the tunnel having a closed front end with an inlet adjacent a tunnel floor and a material moving rotor mounted in the inlet and an open rear end through which material is directed into a bag that is incrementally deployed from the tunnel;
   providing a ramp extending upwardly and rearwardly from the inlet to the rear end of the tunnel;
   forcing material through the inlet and rearwardly and upwardly on the ramp for deposit into the bag at a desired height at the end of the ramp;
   preventing deployment of the bag by said braking action while a previously deployed portion of the bag is being filled with the material off the end of the ramp; and
   selectively and repetitively releasing the braking action to deploy additional bag lengths and thereby creating additional bag space rearward of the ramp to be repetitively filled by material directed off the rear end of the ramp.

2. A bag filling machine comprising:
   a wheel mounted chassis and a tunnel with top, sides and floor mounted on the chassis, a front end of said tunnel having an inlet adjacent the tunnel floor and a material moving rotor mounted at the inlet, said tunnel terminating at a rear end of the tunnel and a ramp extending rearwardly and upwardly from the inlet to the rear end of the tunnel, said rear end of said tunnel enclosed by a deployable bag and defining a bag opening having a bag height whereby material directed by force through the inlet and up the ramp is deposited in the bag at a position mid-point of the bag height; and
   a releasable brake mechanism provided on the chassis to prevent machine movement and thus prevent bag deployment during the filling of the bag, said brake mechanism releasable in response to a back pressure upon filling of the bag to provide additional space behind the ramp for continued material deposit.

3. A bag filling machine as defined in claim 2 wherein the ramp is at least 2' in height from the tunnel floor.

4. A bag filling machine as defined in claim 3 wherein the ramp is angled relative to the tunnel floor at least about a 30 degree angle.

5. A bag filling machine as defined in claim 4 wherein the ramp extends from a position adjacent the inlet and extends to a rear edge of the tunnel floor.

6. A bag filling machine as defined in claim 5 wherein a rear wall forms the rear end of the ramp and separates from the compacted material upon movement of the tunnel forwardly.

7. A process for bagging a compatible agricultural material which comprises:

mounting a deployable bag to surround and enclose an open end of a rigid tunnel supported on and movable over a support surface;

force feeding said material into the tunnel from an inlet at the opposite end of the tunnel to fill the tunnel and then a portion of the bag deployed onto the support surface and not movable on the support surface;

deploying additional portions of the bag from the tunnel as the deployed portion of the bag is filled which deployment results from movement of the tunnel;

braking the tunnel to resist movement and promote compaction and filling of the bag resulting from said force feeding of the material; and controlling the flow of material so as to direct the material from the inlet to the end of the tunnel at a mid-height position of the open tunnel end and producing thereby bag filling pressure at said mid-height position that is directed downwardly and upwardly from said mid-height position as the material enters the bag.

\* \* \* \* \*